Dec. 30, 1969  G. LEE ETAL  3,486,390
VARIABLE SPEED GEAR
Filed Sept. 26, 1967  5 Sheets-Sheet 1
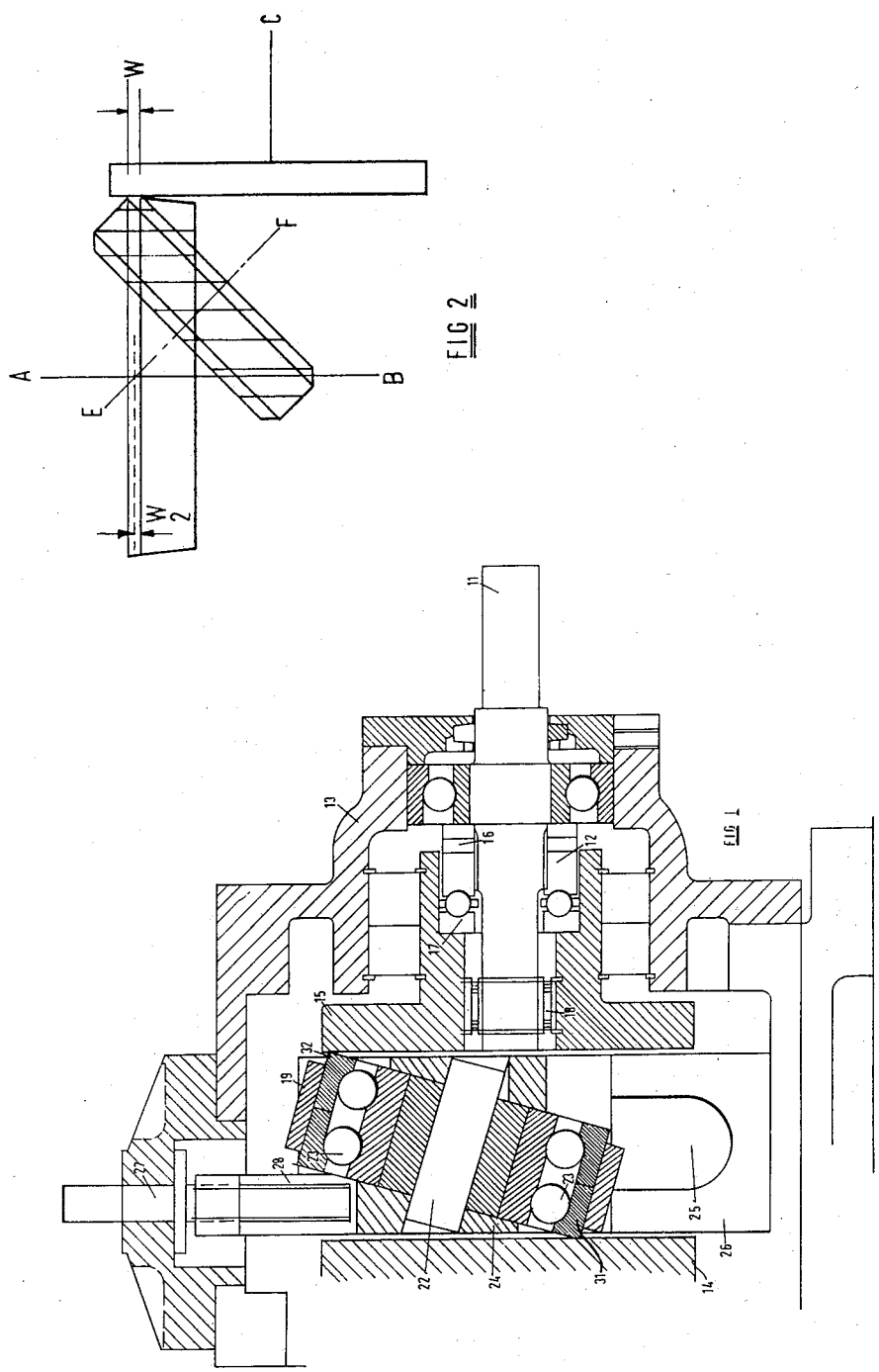
INVENTORS:
GEORGE LEE AND FRANK HOLT
BY
Brennan Brennan Dec. 30, 1969  G. LEE ET AL  3,486,390
VARIABLE SPEED GEAR
Filed Sept. 26, 1967  5 Sheets-Sheet 2
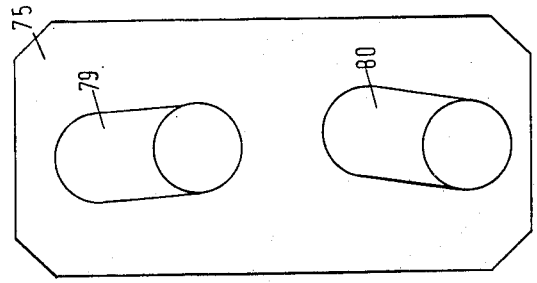
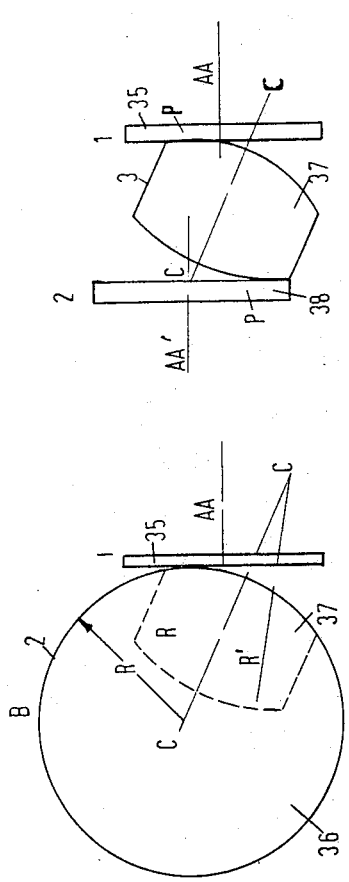
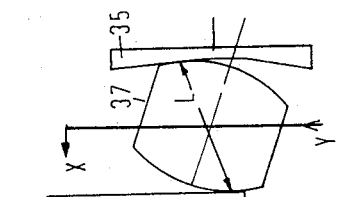
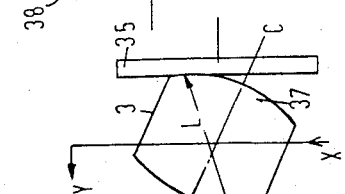
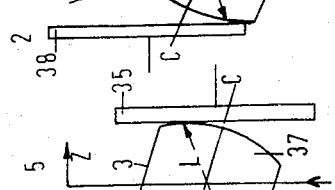
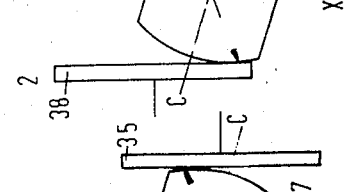
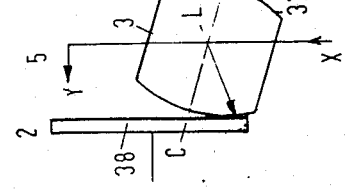
INVENTORS:
GEORGE LEE AND FRANK HOLT
BY
Bierman + Bierman Dec. 30, 1969  G. LEE ETAL  3,486,390
VARIABLE SPEED GEAR
Filed Sept. 26, 1967  5 Sheets-Sheet 3

INVENTORS:
GEORGE LEE AND FRANK HOLT
BY
Brennan & Brennan

Dec. 30, 1969  G. LEE ETAL  3,486,390

VARIABLE SPEED GEAR

Filed Sept. 26, 1967  5 Sheets-Sheet 4

INVENTORS:
GEORGE LEE AND FRANK HOLT
BY
Brennan + Brennan

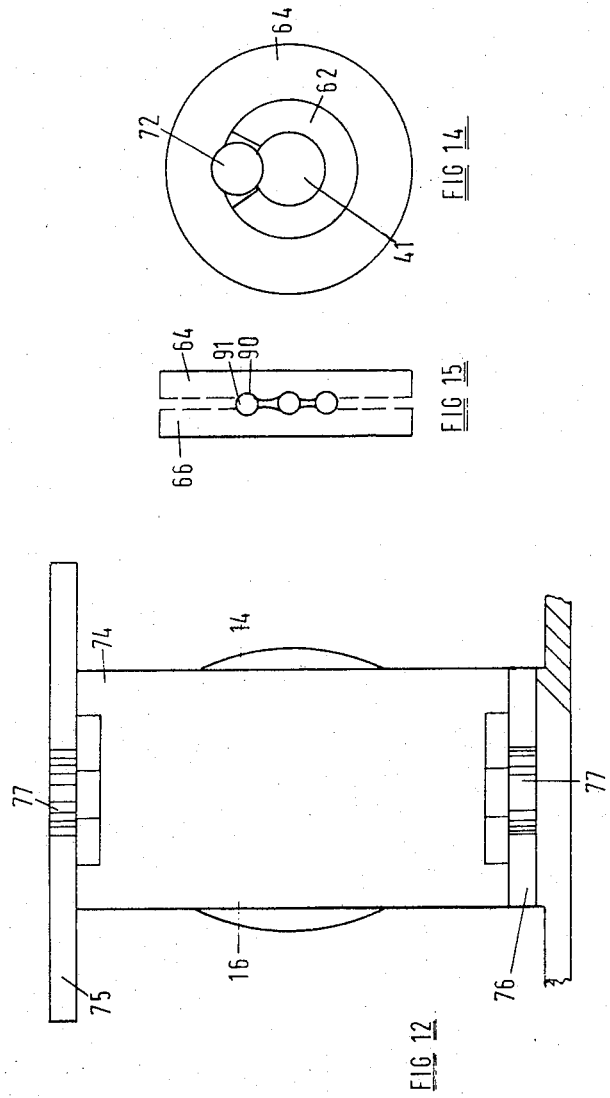

United States Patent Office 3,486,390
Patented Dec. 30, 1969

3,486,390
VARIABLE SPEED GEAR
George Lee, Dorset and Frank Holt, Lancs, England, assignors to H.L.F. Engineering Developments Ltd., a corporation of Great Britain
Filed Sept. 26, 1967, Ser. No. 670,566
Int. Cl. F16h 15/08
U.S. Cl. 74—200    16 Claims

ABSTRACT OF THE DISCLOSURE

A friction gear drive is comprised of a first gear member, a second gear member, and a third gear member. The first gear member is constituted by a disc mounted for rotation on its axis perpendicular to its plane. The second gear member is also rotatably mounted and has a circular peripheral part in driving contact with a face of the disc. The third gear member is also constituted by a disc mounted for rotation on its axis perpendicular to its plane and has a face in driving contact with a circular peripheral part of the second gear member. The second gear member is mounted for translational movement across the faces of the discs to enable the gear ratio of the gear to be altered and for angular movement to alter the position of its axis of rotation.

---

The present invention relates to friction drive gears.

One of the difficulties which arises in such gears is the high compression stresses produced in the parts of the gear members which are in contact and the present invention provides a friction drive gear in which these stresses can be kept to acceptable values.

According to one aspect of the present invention there is provided a friction drive gear comprising a first gear member constituted by a disc mounted for rotation on its axis perpendicular to its plane, a second gear member also rotatably mounted and having a circular peripheral part in driving contact with a face of the disc and a third gear member also constituted by a disc mounted for rotation on its axis perpendicular to its plane and also having a face in driving contact with a circular peripheral part of the second gear member, which latter is mounted for translational movement across the faces of the discs to enable the gear ratio of the gear to be altered, and for angular movement to alter the position of its axis of rotation.

Preferably the discs constituted in the first and third gear members are mounted parallel to one another, the second gear member is located between the discs in contact with their adjacent faces and is mounted for rotation about an axis lying at an angle to the parallel axes of rotation of the discs.

The second gear member advantageously has two curved surfaces on opposite faces of the member and surrounding the axis of rotation of the member, the circular peripheral parts of the second gear member in driving contact with the adjacent faces of the discs being constituted by annular parts of the said curved surfaces and wherein the second gear member is mounted for angular movement about an axis perpendicular to its axis of rotation to enable other annular parts of its curved surfaces to be brought into driving contact with the faces of the discs.

The invention will be further explained by reference to several embodiments thereof which will be described by way of example of the invention only. The description will be given with reference to the following drawings in which:

FIG. 1 is a part section through a known form of gear embodying some of the features of the invention;

FIG. 2 is a diagram illustrating the effects obtained with the gear of FIG. 1;

FIGS. 3–10 are diagrams illustrating the effects obtained with another gear according to the invention;

FIG. 12 is a section on the line XII—XII of FIG. 11, some parts being omitted;

FIG. 13 is a view of a guide plate used in the gear of FIG. 11;

FIG. 14 is a detail showing a spline used in the gear of FIG. 11; and

FIG. 15 is a detail showing part of the input drive for the gear of FIG. 11.

Figure 9:
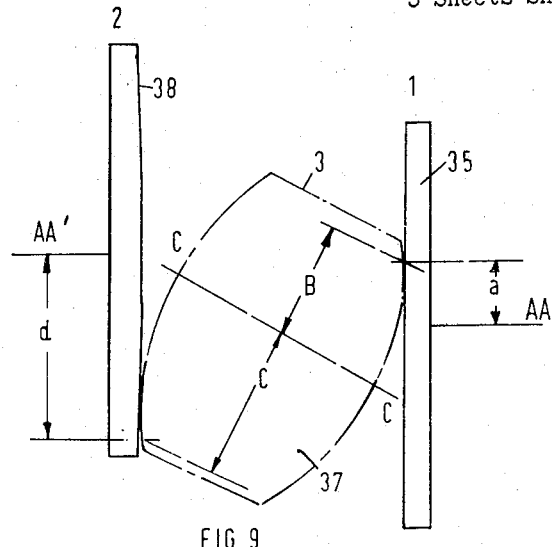

Referring to FIG. 1, there is shown an infinitely variable friction drive gear having an input shaft (not shown) and an output shaft 11 mounted on a common axis. A disc 14 constituting one of the gear members is mounted on the inner end of the input shaft (not shown) and is drivably connected therewith and a second disc 15 constituting another of the gear members is mounted on the inner end of the output shaft 11.

Since the input and output shafts are mounted in identical fashion, only the mounting of the output shaft 11 will be described and shown in detail. The shaft 11 is carried in a thrust bearing 12. The bearing 12 exerts thrust to the left in FIG. 1 by means of a pack of disc washers 16 and a bearing 17 which abuts against a shoulder on the shaft 11. The shaft 11 is also supported in a needle bearing 18.

A further gear member is constituted by a cylindrical member 19 mounted for rotation on a shaft 22 by means of ball bearings 23 adapted to take thrust forces. The shaft 22 is carried in a member 24 slidably mounted by means of trunnions (not shown) engaged in guideways 25 formed in plates 26. Two plates 26 are located within the housing 13 and are arranged parallel to one another on opposite sides of the carrier member 24.

The carrier member 24 is movable in directions up and down in FIG. 1 by means of a screw threaded rod 27 engaged in a screw threaded socket 28 in the carrier member.

Opposite, circular, peripheral end portions 31 and 32 of the cylindrical member 19 are in driving contact with the adjacent faces of the discs 14 and 15 respectively.

When the input shaft of the gear is driven causing the disc 14 to rotate, the cylindrical gear member 19 is rotated about the axis 22. The member 19 imparts rotation to the disc 15 which is transmitted to the shaft 11. There are three possible conditions of the gear:

(1) If the gear member 19 is located wholly above, or wholly below the input and output shafts, the output will rotate in the opposite sense to the input shaft.

(2) If the gear member 19 is in contact with the centre of the disc 14 or the disc 15, no drive will be transmitted through the gear.

(3) If the gear member 19 is in contact with the disc 14 at a point below the input shaft in FIG. 1 and is in contact with the disc 15 at a point above the shaft 11 in FIG. 1, then the output shaft will rotate in the same sense as the input shaft. The gear ratio of the gear will depend on the position of the points of contact of the gear member 19 with discs 14 and 15 in relation to the common axis of rotation of the discs.

FIG. 2 illustrates diagramatically the gear shown in FIG. 1. If a flat plate rotatable on the axis C is driven by a cylinder rotatable on the axis AB, the width of contact is W. By using a cylinder mounted for rotation on the axis EF it is possible to obtain equivalent curvature conditions at the place of contact with a smaller cylinder. This is because the approach to contact from the axis EF is for practical purposes a curvature equal to a radius from the axis AB.

This is also true if the cylinder on the axis AB is replaced by a sphere and if the face of the plate is replaced by a flat surface inclined to the surface of the plate shown or is replaced by a curved surface.

FIG. 3 illustrates the situation where a flat plate 35 is in contact with a sphere 36. The compressive stress at the place of contact and the radius of the circular contact area are governed by the following relationships:

$$S_c = 0.616 \sqrt[3]{\frac{PE^2}{D^2}} \text{ and } a = 0.881 \sqrt[3]{\frac{PD}{E}}$$

where

Sc=unit compressive stress at the place of contact.
P=total load.
D=Diameter of the sphere.
E=Young's Modulus, which is assumed to be the same for the material of the sphere and the material of the plate.
a=The radius of the circular contact area.

In order to obtain low values of Sc, the diameter of the sphere should be large but this makes the size of the gear too unwieldy. In the gear described below, therefore, the sphere is replaced by a section such as that shown by broken lines at 37 in FIG. 3, which can constitute one gear member of a gear, the flat disc 35 constituting another gear member. If the member 37 is mounted for rotation about the axis C—C, rotation of the disc 35 about the axis A—A will cause rotation of the member 37 about the axis C—C.

A third gear member constituted by a flat disc 38 can be introduced, as shown in FIG. 4, to produce a gear similar to that shown in FIG. 1 but with the axis of the two discs parallel but not aligned.

The two radii $R_1$ and R, shown in FIG. 3, need not be the same and in addition, each of these radii can be varied with the result that the two curved surfaces on the gear member 37 are not spherical surfaces although they can be made to approximate to spherical surfaces over small areas.

As in the gear of FIG. 1, if the gear member 37 is moved up or down in FIG. 4, the distances between the axes of the discs 35 and 38 and the points of contact P of the gear member 37 and the discs 35 and 38 will alter and the gear ratio of the gear will thus be altered. If during this movement, the angle $\theta$ between the axes of rotation of the discs and the axis of rotation of the gear member 37 remains constant, the points of contact of the gear member on the discs will change but the points of contact on the gear member will not change. In the gear to be described below, the points of contact on the gear member are arranged to alter as well on translational movement of the gear member.

Referring to FIG. 5, if the gear member 37 is given a translational movement in the direction X in this figure and is at the same time given a rotational movement in the direction Y about an axis perpendicular to the axis C—C and perpendicular to the plane of the figure the points of contact on the gear member are altered as is the distance L between the points of contact. In order to maintain contact, the discs 35 and 38 must be moved towards one another.

In FIG. 6, the gear member 37 has been given a translational movement in the direction X and a rotary movement in the direction Z. In this case, the discs 35 and 38 must move apart because the distance L increases.

In FIG. 7, the surface of the disc 38 has been so shaped that it maintains contact with the gear member 37 when the gear member is moved in the direction X and is rotated in the direction Y.

FIG. 8 shows a similar arrangement in which the disc 35 is concavely shaped to accommodate the change in the distance L.

The arrangements shown in FIGS. 6, 7 and 8 require special mounting of the gear member 37 to ensure that the contact point on one surface of the gear member 37 does not undergo any appreciable side-ways movement.

FIG. 9 illustrates the change in speed in a gear of the kind shown in FIGS. 4 to 8.

The speed of rotation of the disc 38 relative to the speed of rotation of the disc 35 is $$1 \times \frac{a}{b} \times \frac{c}{d}.$$

When $a=b$ and $c=d$, there is no difference in velocity across the circular area of contact between the disc 35 and the gear member 37 and the disc 38 and the gear member 37 and under these conditions, the area of contact can be large. However when $a \neq b$ and $c \neq d$ there is a velocity differential across the area of contact between each disc and the gear member 37. Under these conditions the areas of contact should be kept as small as possible consistent with the maximum stress permissible in order to reduce the velocity differential. Since the area of contact is dependent on the radii R and R', (FIG. 3) these radii can be varied over the two curved surfaces concerned in order to reduce the area of contact in cases where the velocity differential across the area of contact is likely to be high.

Figure 10:
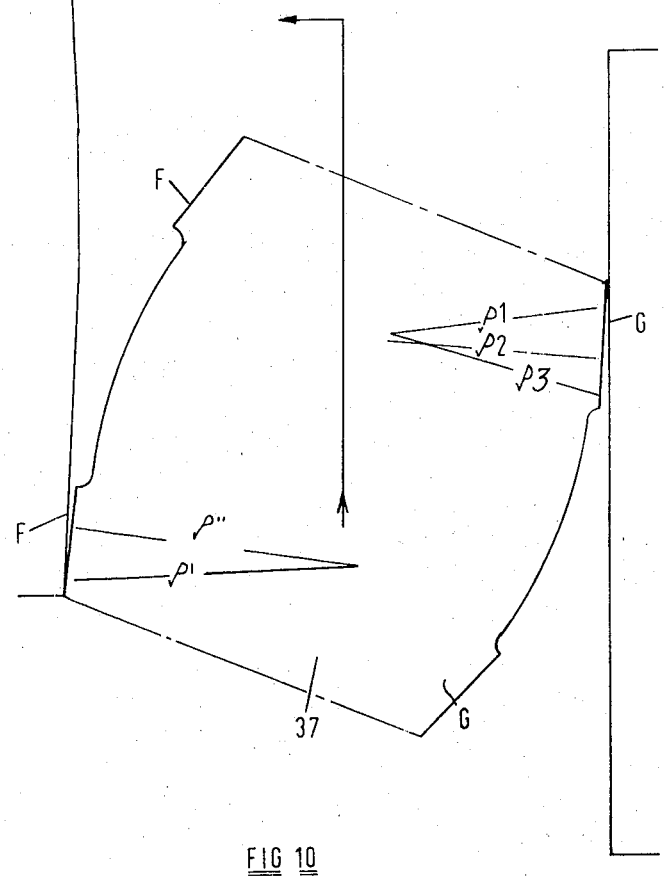

FIG. 10 illustrates a gear member 37 having curved surfaces F and G which are formed of elements having different radii $\rho'$, $\rho''$ and $\rho_1$, $\rho_2$, $\rho_3$ blended together to form a smooth curve.

Figure 11:
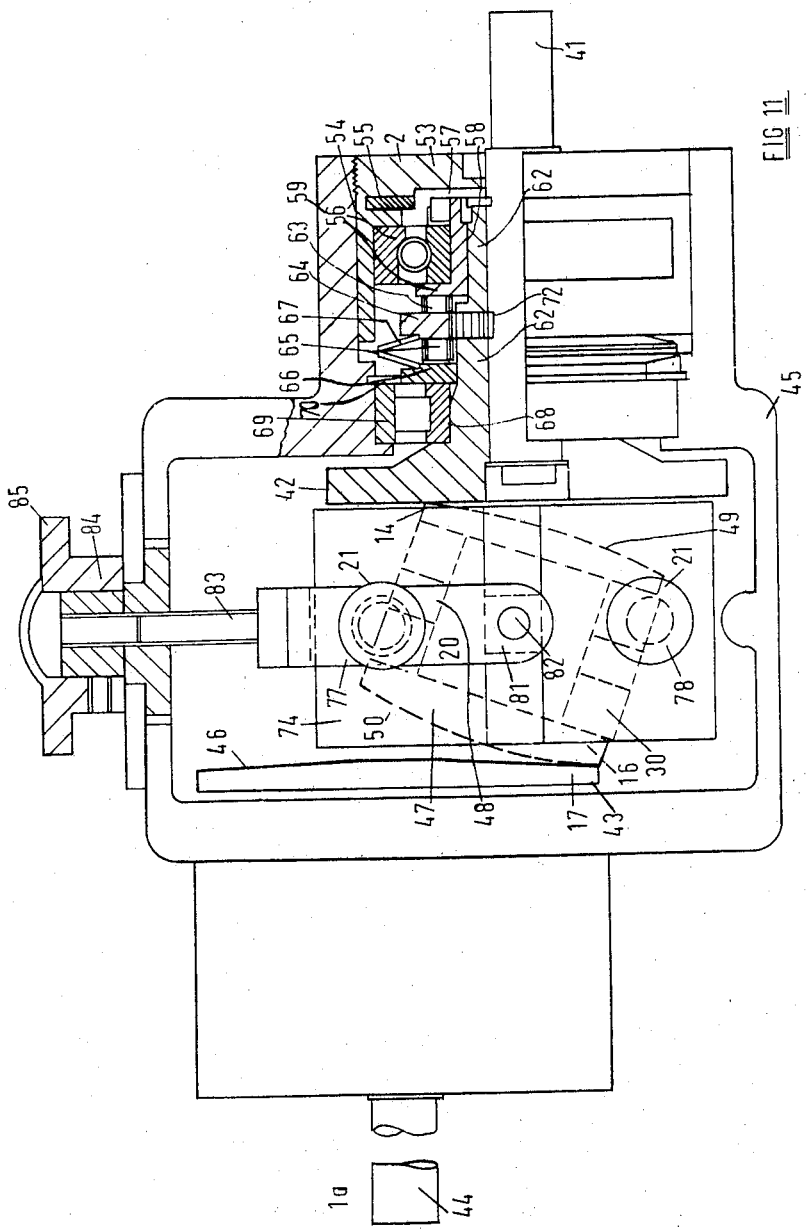
FIG. 11 is a part section through a gear of the kind illustrated in FIGS. 3–10 and embodying the invention.

Referring now to FIG. 11, there is shown a gear embodying the principles just described of the invention.

An input shaft 41 mounted in a housing 45 is drivably connected with a gear member constituted by a flat disc 42 carried on the inner end of the shaft 41. An output shaft 44 also mounted in the housing 45 is drivably connected with a gear member constituted by a disc 43 with a shaped surface 46, the disc 43 being carried on the inner end of the shaft 44.

Drive between the discs 42 and 43 is obtained by means of an approximately barrel-shaped gear member 47 mounted for rotation on an axis 48 and having two curved surfaces 49 and 50 in frictional driving contact with the inner adjacent faces of the discs 42 and 43 respectively, the surfaces 49 and 50 surround the axis of rotation 48 of the gear member 47.

The mounting of the input shaft 41 and the means which provide a drive connection giving variable thrust between this shaft and the disc 42 will now be described. The mounting of the output shaft 44 and the drive connection between that shaft and the disc 43 are identical to the equivalent arrangements for the shaft 41.

The shaft 41 extends into the housing 45 through an end cap 53 formed with a screw thread which is received by a screw thread within the housing. The cap 53 is separated from a sleeve 54 within the housing 45 by a disc spring 55. An angular contact bearing 56 is mounted within the sleve 54 the inner face 57 of which is carried on a sleve 58 having a flanged inner end 59. The sleeve 58 is mounted on a hollow shaft 62 formed in one piece with the disc 42 and carried directly on the shaft 41.

The flanged inner end 59 of the sleeve 58 bears against a set of roller bearings 63 which in turn bear on a flat face of an annular member 64. The opposite face of the annular member 64 comprises a number of facets inclined to the plane of its other face and each facet has associated with it a roller bearing 65 which bears against a corresponding facet on a second annular member 66. The two annular members 64 and 66 are urged apart by disc springs 67.

The annular member 66 is carried on the hollow shaft 62 formed in one piece with the disc 42 and abuts against the inner race 68 of a roller bearing 69 which supports the shaft 62 and thus the shaft 41. The inner race 68 abuts against the rear face of the disc 42. The outer race of the bearing 69 is held in place by a circlip 70.

The annular member 64 is keyed to the shaft 41 by means of a round key 72 (FIG. 14) which also keys the shaft 62 to the shaft 41.

Drive is transmitted from the shaft 41 to the hollow shaft 62 of the disc 42 and to the annular member 64 through the key 72. The member 64 is thus caused to rotate relative to the annular member 66. The roller bearings 65 rolling on the inclined facets on the member 64 cause extra thrust to be exerted by the member 64 on the member 66 and thus on the disc 42 through the inner race 68 of the bearing 69.

This extra thrust is self-adjusting according to the output torque on the shaft 44 and when this falls, the roller bearings 65 tend to move back down the inclined facets on the annular member 64. This movement is assisted by the disc springs 67.

The arrangement just described for producing variable thrust exerts the highest thrust when the output torque is high and hence makes the largest amount of frictional force available when it is required, for example on starting up.

If additional pressure between the disc 42 and the gear member 47 is required, the cap 53 is screwed further in thus exerting additional thrust through the disc spring 55, the sleeve 54, the bearing 56 and so on.

In order to enable the gear ratio to be altered, provision is made for bringing about lateral movement of the gear member 47 in directions up and down in FIG. 11. The member is so mounted that it undergoes rotational movement at the same time as its translational movement, this rotational movement taking place about an axis perpendicular to the axis of rotation 48 and perpendicular to the plane of FIG. 11.

The gear member 47 is mounted in a carrier 74 for rotation about the axis 48 and the carrier 74 is slidably mounted in cam plates 75 and 76 (FIG. 12) by means of trunnions 77 and 78 incorporating ball bearings and engaged in slots 79 and 80 in the cam plates. A cross-head 81 is held in the carrier 75 by a pin 82. The cross-head 81 has connected to it a screw-threaded bolt 83. The bolt 83 projects out of the housing 45 and is received in a nut 84 rotatable by a handwheel 85.

The carrier 74 can be moved up or down in FIG. 11 by rotating the hand wheel 85 and thus causing upward or downward movement of the bolt 83.

As the carrier 74 slides up or down it is tilted to one side or the other because of the engagement of its trunnions 77 and 78 in the slots 79 and 80. FIG. 13 shows the arrangement of these slots. As the carrier moves up in FIG. 11, the upper trunnions 77 are thrown to the left and the lower trunnions 78 are thrown to the right. The slots 79 and 80 are so arranged in relation to the shape of the curved surfaces 49 and 50 on the gear member 47 that the point of contact of the surface 49 with the flat disc 42 does not move to the left or right in FIG. 11 but change in the distance between the points of contact of the gear member 47 with the discs 42 and 43 is entirely accommodated by a shift of the surface 50 to the left or right. This shift is allowed for by the slope on the surface 46 of the disc 43.

The movement of the carrier 74 in the slots 79 and 80 is equivalent to an up ore down movment of the carrier together with a rotational movement of the carrier about an axis perpendicular to the axis of rotation 48 and perpendicular to the plane of FIG.11. The effect of the rotational movement of the carrier with the gear member 47 about the axis just defined is to bring different parts of the curved surfaces on the gear member into contact with the surfaces of the discs 42 and 43. Thus, when the gear member is moved to alter the gear ratio, the points of contact on the gear member are altered as well as the points of contact on the discs 42 and 43 and wear at any one point on the gear member is thus reduced.

FIG. 15 shows an alternative arrangement for providing variable thrust to the discs 42 and 43. Ball bearings 90 are located in shaped sockets 91 formed between the annular members 64 and 66. Rotation of one of these annular members relative to another causes the balls 90 to ride up the sides of the sockets 91 causing increased thrust between the annular members.

What we claim is:

1. A friction gear drive comprising a first gear member constituted by a disc mounted for rotation on its axis perpendicular to its plane, a second gear member also rotatably mounted and having a circular peripheral part in driving contact with a face of the disc, said second gear member having an axis of rotation, said axis having a center point, and a third gear member also constituted by a disc mounted for rotation on its axis perpendicular to its plane and also having a face in driving contact with a circular peripheral part of the second gear member, means for selectively providing translational movement to said second gear member so that said second gear member moves across the faces of the discs and enables the gear ratio of the gear to be altered, said means also providing angular movement to rotate the second gear member about said center point, thereby altering the position of its axis of rotation.

2. A friction gear drive as claimed in claim 1 wherein the discs constituting the first and third gear members are mounted parallel to one another, the second gear member is located between the discs in contact with their adjacent faces and is mounted for rotation about an axis lying at an angle to the parallel axes of rotation of the discs.

3. A friction gear drive as claimed in claim 2 wherein the second gear member is constituted by a cylinder, peripheral parts of the cylinder at opposite ends thereof being in contact with the faces of the discs.

4. A friction gear drive as claimed in claim 3 wherein the second gear member is approximately barrel-shaped having a curved surface surrounding the axis of rotation of the member, peripheral parts of the second gear member being in driving contact with the adjacent faces of the discs and being constituted by annular parts of the said curved surface.

5. A friction gear drive as claimed in claim 4 wherein the face of at least one of the discs is radially inclined to allow for increase or decrease in the distance between the areas of driving contact between the discs and the second gear member upon angular movement of the second gear member.

6. A friction gear drive as claimed in claim 4 wherein the discs are yieldably urged towards the second gear member whereby they will move towards or away from one another to allow for increase or decrease in the distance between the areas of driving contact between the discs and the second gear member upon angular movement of the second gear member.

7. A friction gear drive as claimed in claim 1 wherein the second gear member is constituted by a cylinder, peripheral parts of the cylinder at opposite ends thereof being in contact with the faces of the discs.

8. A friction gear drive as claimed in claim 7 wherein the second gear member is approximately barrel-shaped, having a curved surface surrounding the axis of rotation of the member, peripheral parts of the second gear member being in driving contact with the adjacent faces of the discs and being constituted by annular parts of the said curved surface.

9. A friction gear drive as claimed in claim 8 wherein the face of at least one of the discs is radially inclined to allow for increase or decrease in the distance between the areas of driving contact between the discs and the second gear member upon angular movement of the second gear member.

10. A friction gear drive as claimed in claim 8 wherein the discs are yieldably urged towards the second gear member whereby they will move towards or away from one another to allow for increase or decrease in the distance between the areas of driving contact between the discs and the second gear member upon angular movement of the second gear member.

11. A friction gear drive as claimed in claim 1 wherein means are provided for causing the second gear member, upon translational movement thereof, to move angularly.

12. A friction gear drive as claimed in claim 11 wherein the second gear member is mounted for rotational movement in a carrier having a pair of trunnions projecting therefrom on each of two opposite sides thereof, each trunnion being engaged in a separate slot fixed with respect to a housing for the gear and the slots being so inclined and that the carrier, with the second gear member, is capable of translational movement across the adjacent faces of the two discs and is guided for simultaneous angular movement.

13. An infinitely variable friction gear drive comprising a first gear member constituted by a disc mounted for rotation about its axis perpendicular to its plane, a second gear member mounted for rotation about an axis lying at an angle to the axis of rotation of the disc and having a curved surface surrounding its axis of rotation, a circular peripheral part of the second gear member constituted by an annulus in the said curved surface being in driving contact with a face of the disc, said second gear member having an axis of rotation, said axis having a center point, and means for selectively providing translational movement to the second gear member so that the latter moves across the face of the discs and enables the gear ratio of the gear to be altered, said means also providing angular movement to rotate the second gear member about said center point, thereby altering the position of its axis of rotation and enabling a different annular part of its curved surface to be brought into driving contact with the disc; and a third gear member also constituted by a disc mounted for rotation on its axis perpendicular to its plane and also having a face in driving contact with a circular peripheral part of the second gear member.

14. A friction gear drive as claimed in claim 13 including means for providing movement of one or both of the discs along its axis of rotation in a direction away from the other disc against a baising force to allow for changes in the distance apart of the points of contact of the second gear mmber with the two discs.

15. A friction gear drive as claimed in claim 13 wherein one of the discs is radially inclined to allow for changes in the distance apart of the points of contact of the second gear member with the two discs and means are provided for causing the second gear member, upon translational movement thereof, to move angularly.

16. A friction gear drive as claimed in claim 15 wherein the second gear member is mounted for rotational movement in a carrier having a pair of trunnions projecting therefrom on each of two opposite sides thereof, each trunnion being engaged in a separate slot fixed with respect to a housing for the gear and the slots being so inclined that the carrier, with the second gear member, is capable of translational movement across the adjacent faces of the two discs and is guided for simultaneous angular movement.

References Cited
UNITED STATES PATENTS

| | | | |
|---|---|---|---|
| 2,936,638 | 5/1960 | Wassilieff | 74—200 |
| 3,242,748 | 3/1966 | Prager | 74—200 |

FRED C. MATTERN, Jr., Primary Examiner

JAMES A. WONG, Assistant Examiner